April 14, 1964
M. L. ANTHONY
3,128,645
MACHINE TOOL CHANGER
Filed April 18, 1960
2 Sheets-Sheet 1
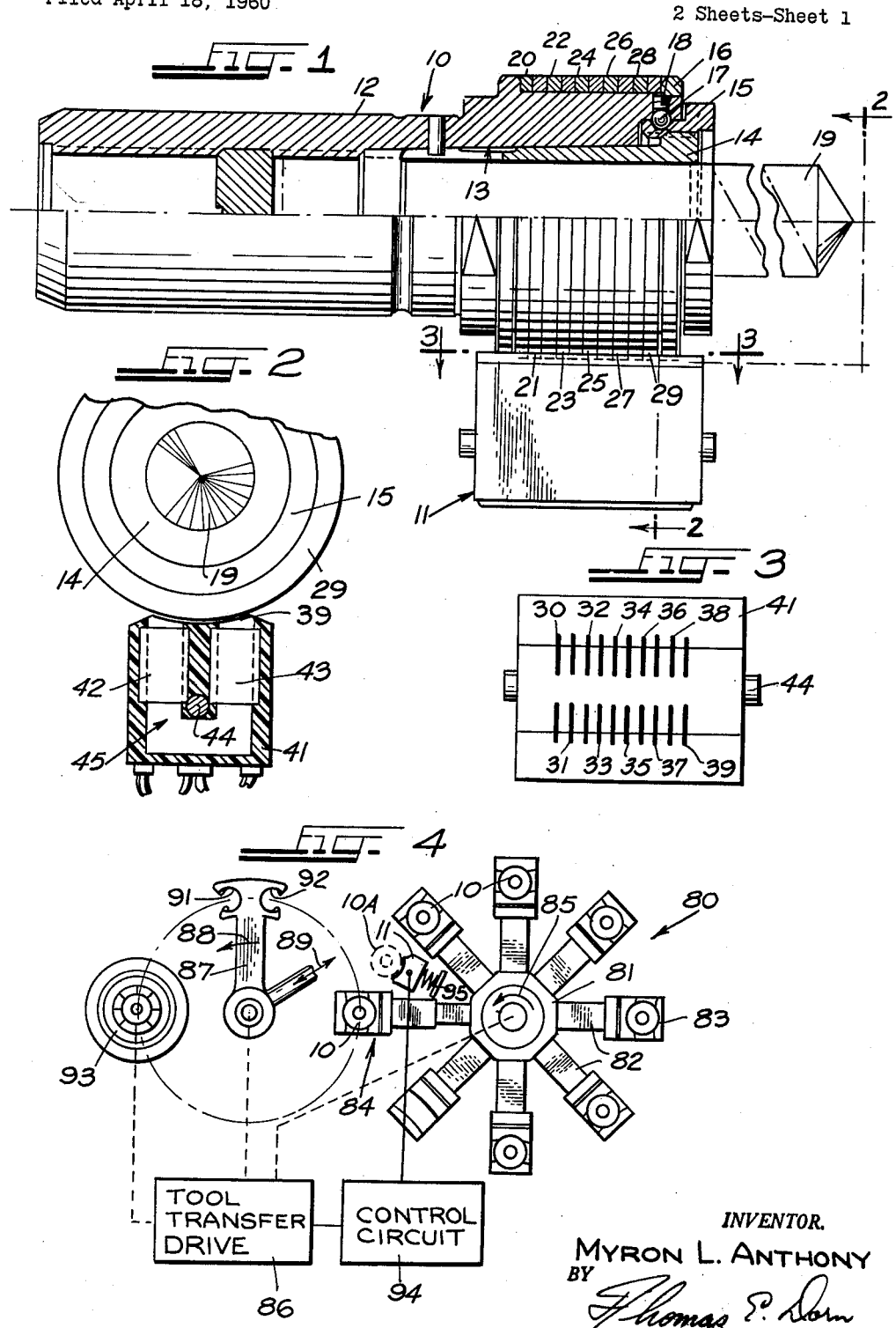
INVENTOR.
MYRON L. ANTHONY
BY
Thomas P. Dorn

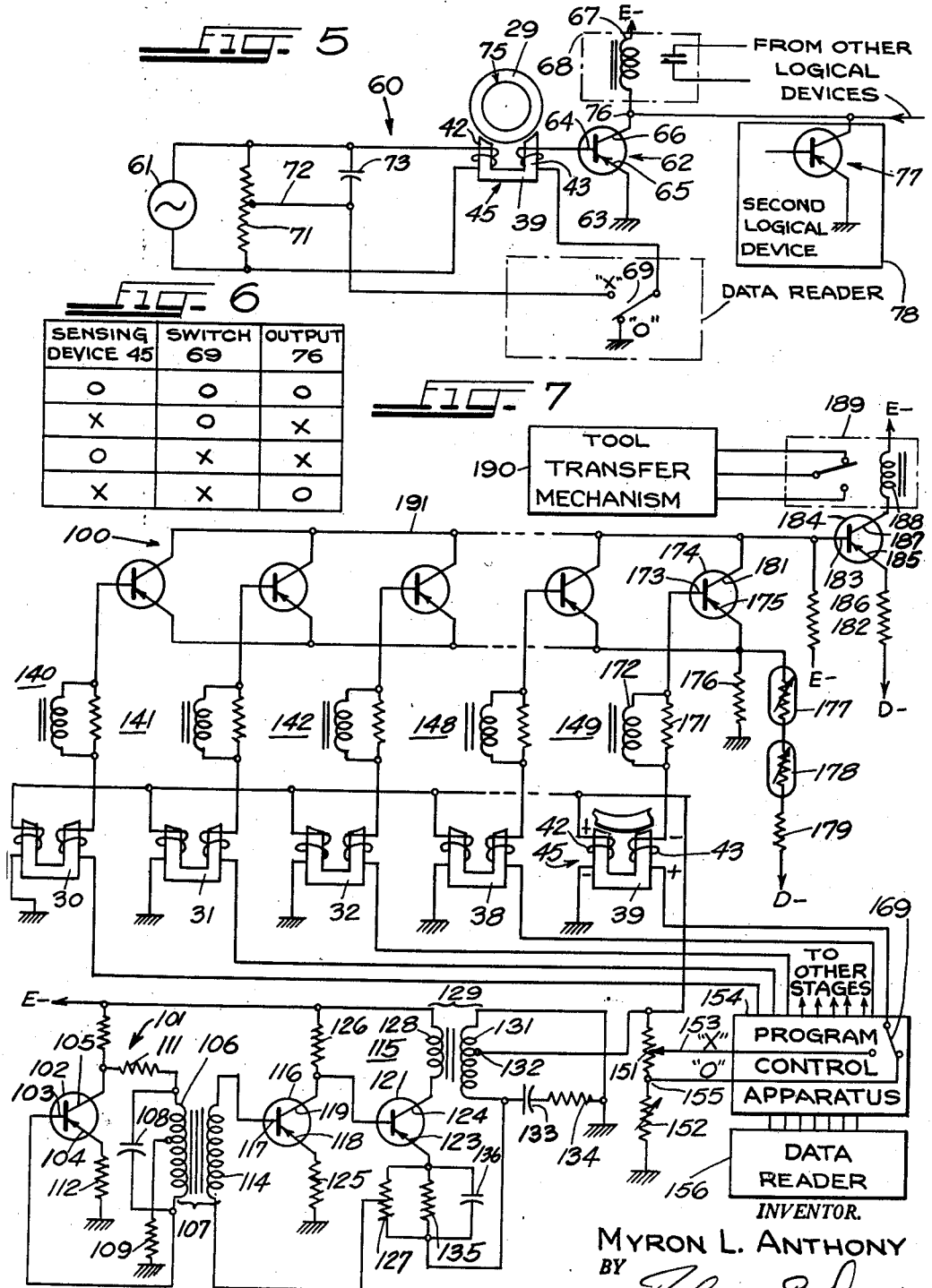

United States Patent Office 3,128,645
Patented Apr. 14, 1964

3,128,645
MACHINE TOOL CHANGER
Myron L. Anthony, La Grange, Ill., assignor to Scully-Jones & Company, Chicago, Ill., a corporation of Illinois
Filed Apr. 18, 1960, Ser. No. 23,046
11 Claims. (Cl. 77—5)

This invention relates to a new and improved control system for a data-controlled machine tool, and more particularly to a control system which provides for selective transfer of tools into and out of operating position in accordance with pre-recorded control data. The invention also relates to a new and improved amplifier circuit which is particularly advantageous as applied to a control system of this kind.

In most data-controlled machine tools, as heretofore known, the various tool members to be used in a machining operation have usually been mounted in a storage magazine in predetermined locations, the machine being provided with means for determining which of the storage locations is present at a transfer position or operating position. The magazine itself has sometimes been provided with code data in order to permit sensing devices of one kind or another to check the position of the storage magazine at any time. In systems of this kind, accuracy and efficiency of the machining operation depend upon location of the desired tool members at the pre-selected magazine locations when the machine is first set up, and also require that the control data be co-ordinated with the magazine storage locations rather than the tools themselves, since no means is provided for identification of the tools other than their location in the storage magazine.

In at least one previously known system, a different organization has been adopted. In this system, the individual tools, or more accurately toolholders for the tools, are provided with code designations which identify the tools. The encoding, in this arrangement, comprises a series of code rings located at predetermined positions on the toolholder or tool assembly, the number and spacing of the rings serving to identify the particular tool. Code interpretation, in this system, is effected by means of a series of switches which are engaged by the code rings and are selectively actuated to opened or closed positions. The sensed data are utilized to control operation of a tool transfer mechanism, in conjunction with pre-recorded data which may be in the form of a punched tape, punched record cards, or any other conventional data recording arrangement. However, substantial difficulty has been encountered in maintaining operation of sensing devices of this kind. The switches tend to wear out considerably more rapidly than other components of the control system. Moreover, because the machine frequently is operated under somewhat adverse conditions with respect to the presence of scrap meal, dirt, and the like, the switches may become clogged or undesirable deposits may be encountered in the code portions of the tool assemblies. Under either circumstance, the control system may malfunction, resulting in considerable loss.

The control system of the present invention provides for encoding of individual tools, by means of a series of code elements. The code selected may be an arbitrary one, but usually is some form of a binary code. The code elements, however, are not dimensionally different from each other; rather, they differ from each other with respect to field-coupling properties. In the preferred arrangement described hereinafter, this difference is achieved by the use of code elements selected from two groups, one group having relatively low reluctance and the other having relatively high reluctance. Thus, the code elements differ from each other with respect to their coupling properties in a magnetic field. A similar effect can be achieved with respect to electrical field properties by using conductive and non-conductive code elements. Interpretation of the code is effected by the use of individual fiield-sensing elements such as, in the preferred embodiment, variable reactance devices. Consequently, there are no switches employed for code sensing, in the present invention, and no physical contact is required between the code elements and the sensing elements, with the result that malfunctioning of the control system of this source is effectively eliminated.

The present invention also entails the use of a novel logical control circuit arrangement, in which the code sensing elements are each incorporated in a coincidence circuit. This aspect of the system is highly advantageous in that it prevents spurious operation which might otherwise result in the course of the sensing operation. The particular coincidence circuits utilized in the preferred embodiment of the invention are of the type described and claimed in the co-pending application of Myron L. Anthony, Serial No. 23,071, filed concurrently herewith. The control circuit of the present invention also includes a novel amplifier circuit having an extremely low output impedance, which is of substantial advantage in providing a steady operating voltage to a plurality of sensing circuits, regardless of whether those circuits are loaded or not.

It is an object of the invention, therefore, to provide a new and improved control system for a data-controlled machine tool which effectively eliminates or minimizes the difficulties and disadvantages of previously known systems.

Another object of the invention is to provide for code interpretation, relative to individually coded tool assemblies in a data-controlled machine tool, without requiring positive engagement between the sensing or interpreting device and the tool assembly. In fact, the present invention does not require any physical engagement between the sensing elements and the code elements.

Another object of the invention is to provide for high-speed operation of the control system for a data-controlled machine tool by eliminating mechanical inertia as a factor in operation of a code sensing apparatus for individually encoded tools or tool assemblies.

An additional object of the invention is to provide a new and improved logical control circuit, in a control system for a data-controlled machine tool, which permits effective utilization of a plurality of control stages without limiting the coding to a uniform number of stages.

Another object of the invention is to provide a new and improved amplifier circuit for a control system, which amplifier circuit affords a very low output impedance yet is highly stable in operation.

A specific object of the invention is to provide a new and improved amplifier circuit having independent A.C. and D.C. feedback circuits and affording an extremely low output impedance without entailing sacrifice of operational stibility.

A corollary object of the invention is to provide a new and improved control system for a data-controlled machine tool which affords substantially indefinite maintenance free operational life, yet which is substantially simple and economical in construction.

Other and further objects of the present invention will be apparent from the following description and claims and are illustrated in the accompanying drawings which, by way of illustration, show a preferred embodiment of the present invention and the principles thereof and what is now considered to be the best mode contemplated for applying these principles. Other embodiments of the invention embodying the same or equivalent principles may be used and structural changes may be made as desired by those skilled in the art without departing from the present invention and the purview of the appended claims.

In the drawings:

FIG. 1 is a side elevation view, partly in cross section, of a tool holder assembly encoded in accordance with the present invention, together with a sensing apparatus for sensing the code data of the toolholder;

FIG. 2 is a front elevation view, partly in cross section, of the toolholder assembly and sensing apparatus, taken approximately along line 2—2 in FIG. 1;

FIG. 3 is a plan view of the sensing apparatus, taken approximately along line 3—3 in FIG. 1;

FIG. 4 is a schematic illustration of a tool transfer system in which the control system of the present invention may be incorporated;

FIG. 5 is a simplified schematic circuit diagram of a logical control device which may be employed in the control system of the invention;

FIG. 6 is a truth table employed to explain the operation of the circuit of FIG. 5; and FIG. 7 is a detailed schematic diagram of a preferred embodiment of the electrical control circuit for the control system of the invention.

FIGS. 1–3 illustrate two of the principal components of a preferred embodiment of the present invention, these components being a tool holder assembly 10 and a sensing apparatus 11. The toolholder assembly comprises a body member 12 having a tapered recess 13 at the right-hand end thereof as seen in FIG. 1. A tapered collet 14 is fitted within the recess 13 and is held in position in the recess by means of a locking and ejecting ring 15 that engages a shoulder on the outer portion of the collet. The ring 15, in turn, is mounted upon the body member 12 by means of a locknut 16. In the preferred construction illustrated in FIG. 1, the ring 15 is provided with an annular groove, and the body member 12 is provided with a mating groove. A plurality of balls 17 are disposed in these grooves, affording a ball bearing between the body member 12 and the ring 15. The balls may be inserted in the grooves through an opening which is subsequently closed by a set screw 18.

As thus far described, the toolholder 10 is essentially similar in construction to that described in Patent No. 2,709,600 to Lehde, issued May 31, 1955. Accordingly, a detailed description of the operational characteristics of the toolholder is deemed unnecessary herein. Thus, a tool such as a drill 19 is mounted in operational position in the toolholder 10 in conventional manner, being gripped in the collet 14. The construction of the toolholder, insofar as the tool gripping and mounting elements thereof may be concerned, is not critical to the present invention. Accordingly, it should be understood that the construction described hereinabove is provided only by way of example, and that any other basic toolholder structure may be adopted if desired.

The toolholder 10 is provided with encoding means to identify the toolholder, and hence, to identify the particular tool 19 mounted therein. This encoding means, in the embodiments of FIGS. 1 and 2, comprises a series of individual code elements which in this instance are metal rings 20–29. The code rings 20–29 are preferably of uniform size and configuration, so that a substantially smooth unbroken surface is presented at the exterior of the toolholder 10. However, the code elements are different from each other in that they are selected from two groups having different field-coupling properties. In this instance, the difference between the two groups is based upon their magnetic properties, some of the rings 20–29 being formed from a low-reluctance material, such as a relatively soft steel, and a high-reluctance material, which may be, for example, brass or other non-magnetic metal. In fact, the code elements of the second group could be formed from non-metallic material such as a plastic or the like. Since there are ten individual rings, there are 1024 possible different code combinations. However, it is not essential that ten code elements be utilized in encoding the toolholder assembly 10; rather, any desired number may be utilized for this purpose so long as enough code elements are employed to provide adequate differentiation between a substantial number of tools. Coding is on a binary basis. Thus, if a magnetic ring is taken to represent a binary "zero" and a non-magnetic ring is considered to represent a binary "one," the toolholder 10 may be encoded with the binary numeral 011001101 by utilizing magnetic rings for the code elements 20, 24, 25 and 28, non-magnetic code elements being employed for the remaining code positions.

The sensing apparatus 11, in the embodiment of FIGS. 1–3, comprises a plurality of magnetic cores 30–39 embedded in an insulating housing 41. The cores 30–39 correspond in number to the code elements 20–29 and are positioned for individual alignment with the code elements. Each of the cores 30–39 is provided with two electrical windings. Thus, as shown in the sectional view of FIG. 2, the core 39 is provided with a primary winding 42 and a secondary winding 43, affording a transformer, or more aptly a variable reactor 45. The assembly 11 may include a central shaft 44 to provide for mounting of the housing, or other mounting means may be employed if desired. In a preferred construction, the housing 41 is formed from epoxy resin, the cores and coils being "potted" in the resin in accordance with well known techniques. As explained in greater detail hereinafter, each of the reactors, such as the reactor 45 comprising the core 39 with its coils 42 and 43, constitutes a field-sensitive sensing element which exhibits substantially different electrical properties when located in close proximity to code elements from the two different groups. That is, if the code element 29 is non-magnetic, as in the example set forth hereinabove, the coupling between the windings 42 and 43 is very much smaller than would be the case if the code element were formed of magnetic material. This attribute of the sensing element 45 is utilized in achieving basic control functions, in the system of the present invention, as described hereinafter.

FIG. 5 illustrates a control circuit 60 which is essentially similar to the logical circuits described in the co-pending application of Myron L. Anthony, Serial No. 23,071, filed concurrently herewith, and which may be utilized as a control means in the control system of the present invention. The input circuit of the logical device 60 comprises an A.C. power supply 61, which may be conventional sixty-cycle A.C. source, or any other suitable source of alternating current. The logical device 60 further includes one of the variable reactors or transformers of FIG. 3, specifically the sensing device 45.

The primary winding 42 of the reactor 45 is connected across the power supply 61. A simple detector circuit 62 is incorporated in the logical device 60, the detector comprising a transistor 63 having a base electrode 64, an emitter electrode 65, and a collector electrode 66. The base electrode 64 is connected to one end of the secondary winding 43 on the variable reactor 45. The emitter electrode 65 is grounded, whereas the collector electrode is connected to a suitable biasing source E— by a load circuit which includes, in series, the operating coil 67 of a control relay 68. The control relay 68 may be provided with any number of operating contacts; only one pair of contacts are shown in FIG. 5.

The remaining terminal of the secondary winding 43 of the reactor 45 is connected to a switch 69. The switch 69 is a single-pole double-throw device, having a "O" terminal which is grounded and an "X" terminal which is connected back to the power supply 61. The coupling circuit from the switch 69 to the power supply 61 comprises a resistor 71 which is connected across the power supply and a variable tap 72 for the resistor which is returned to the "X" terminal of the switch 69. Preferably, a capacitor 73 is connected in parallel with one section of the tapped resistor 71. Thus, the device 60 comprises two coupling circuits, one of which includes the variable reactance device or sensing element 45, the two coupling circuits being interconnected by the winding 43 in the input to the detector 62.

In considering the operation of the logical device 60 of FIG. 5, it may first be assumed that one of the non-magnetic code rings, ring 29, is in position 75 adjacent the variable reactor 45, this being defined as the "O" operating condition for the reactor. Moreover, the switch 69 is also in its "O" position. Under these circumstances, the effective impedance of the reactor is quite high. Consequently, although a relatively high-amplitude A.C. signal may be applied to the primary winding 42 of the reactor, only a relatively low-amplitude signal is induced in the secondary winding 43. The construction of the circuit is preferably such that, under these circumstances, the signal applied to the input electrode 64 of the transistor 63 is not sufficient to render the transistor conductive. Accordingly, the operating coil 67 of the relay 68 is not energized and the relay contacts remain in their normal open position. This operating condition, with the relay 67 not energized, may be considered to represent the "O" operating condition for the logical control device 60.

If the code ring, such as the ring 29, located at position 75 is of magnetic material, the mutual coupling between the windings 42 and 43 increases to a substantial extent. Stated differently, the effective impedance of the variable reactance, transformer 45, decreases substantially; this is defined as the "X" operating condition of the reactor. Consequently, a control signal of substantial amplitude is applied to the input electrode 64 of the detector circuit 62. As a consequence, the transistor 63 is rendered conductive, energizing the control relay 68 to establish what may be referred to as the "X" operating condition for the logical control device 60.

If the reactor 45 is left in its "O" condition and the switch 69 is closed to its "X" condition, the logical control device 60 is also actuated to its "X" operating condition. Thus, closing of the switch 69 to its "X" condition is effective to apply a control signal of substantial amplitude to the secondary winding 43 of the reactor 45 and hence to the input electrode 64 of the detector circuit 62. Accordingly, an output signal of substantial amplitude is developed at the output terminal 76 of the detector, energizing the relay 68 and thus duplicating the operating effect of actuating the reactor to its alternate or "X" position.

On the other hand, if the reactor 45 is actuated to its alternate or "X" condition, and the switch 69 is also closed to its "X" position, two control signals are applied to the input circuit of the detector circuit 62, comprising the secondary winding 43 on the core 39 of the variable reactance 45. The circuit is constructed to apply these two signals to the secondary winding in substantially opposing phase, with the result that the two signals tend to cancel each other and no more than a relatively low-amplitude signal is effectively applied to the base electrode 69 of the detector transistor 63. Accordingly, the output signal appearing at the output terminal 76 of the detector circuit is essentially negligible for this operating condition, the relay 68 is not actuated, and the logical control device 60 remains in its initial or "O" operating condition. Accordingly, it is seen that the truth table of FIG. 6 is directly applicable to the control circuit 60 of FIG. 5 and that the circuit 60 operates as a coincidence device of the kind conventionally referred to as a quarter-adder.

The circuit illustrated in FIG. 5 also includes a second detector circuit 77 which is essentially similar to the detector 62 and which is incorporated in a logical control device 78 which may be essentially similar to the driving circuit for the detector 62. Furthermore, and also as indicated in FIG. 5, additional logical control circuits may also be connected to the relay 68. The additional logical control devices each include one of the sensing elements or variable transformers, comprising cores 30–38, described hereinabove. These sensing elements are, of course, conditioned by the corresponding code elements 20–28 of FIGS. 1 and 3.

The switch 69, in the control circuit 60, is representative of a conventional data reader for reading coded data to control a machine tool in which the toolholder assemblies, such as the device 10, are employed. For example, the data input to the machine tool could be in the form of conventional record cards punched in accordance with a decimal code, thus affording ten punch positions in each column of the card. On this basis, there is one-for-one coincidence between the code designations on the record card and the code elements 20–29 of the toolholder. With an arrangement of this kind, the switch 69 could comprise a conventional reading brush or sensing pin in a card sensing mechanism. On the other hand, it may be desirable to control the machine tool from some other data source, such as a punched tape, or a magnetic tape, in which one-for-one coincidence is not present. Under these circumstances, the data reader may include a conventional translating circuit to translate the recorded data into the tool code, in which case the switch 69 is controlled by the translator. Inasmuch as data sensing and translating devices of this kind are well known, and since a wide variety of different data sources may be employed, no particular data reader construction is illustrated herein.

FIG. 4 illustrates a tool transfer mechanism 80 which exemplifies the kind of transfer mechanism which the present invention is adapted to control. The transfer mechanism 80 includes a rotary storage magazine 81 having a plurality of radial arms 82 each equipped with a tool storage member 83. The arms 82 are of telescoping construction, and the mechanism 80 is provided with means, not shown, for extending the particular arms 82 located at a transfer position 84 and for retracting the arm after it passes the transfer position. The direction of rotation of the tool magazine 80 is indicated by the arrow 85, the storage magazine being driven by a suitable drive mechanism 86.

The transfer mechanism 80 further includes a rotary transfer member 87 which is mounted for rotational movement, as indicated by the arrow 88, and which may be also arranged for reciprocating axial movement as indicated by the arrows 89. The transfer member 87 is provided with a pair of gripping devices or jaws 91 and 92 at the outer end therof. The transfer member 87 is also mechanically connected to the drive unit 86. The spindle of the machine tool with which the transfer mechanism 80 is associated is also shown in FIG. 4 and is indicated by the reference numeral 93. Means are provided for actuating the spindle 93 between a tool gripping and tool receiving condition, as by mechanical connection to the drive unit 86. The drive unit 86, on the other hand, is actuated by a control circuit 94. The control circuit 94 is electrically connected to the drive unit 86 and is also electrically connected to the sensing apparatus 11. In the transfer mechanism 80, the sensing apparatus 11 is resiliently mounted, as by means of a spring mount 95, at a position immediately ahead of the transfer position 84 in the path of movement of the tool storage members 83.

In operation of the transfer mechanism 80, individual toolholder assemblies, such as the toolholder 10 (FIG. 1) sometimes referred to herein as tool transfer members, are positioned in the storage members 83 of the magazine 81. In a given machining operation, it may be that each of the storage members 83 will be required to hold a tool in storage position; on the other hand, it may only be necessary to utilize some of the storage members. To effect a tool transfer operation, code data is fed to the control circuit 94 and actuates the control circuit which, in turn, actuates the tool transfer drive 86. The control circuit 94 may include a series of logical control circuits, such as the circuit 60 of FIG. 5, and in addition may comprise a complete data reading device and additional control circuits for actuating the drive unit 86. With the drive unit 86 actuated, the storage magazine 81 is started in rotation, bringing each of the storage members 83, in succession, into proximity with the sensing apparatus 11. Each time one of the storage members 83 reaches a sensing position, with the toolholder in the position 10A, the code data on the toolholder is sensed by the sensing apparatus 11 and is compared, in the control circuit 94, with other code data representative of the tool to be transferred to operating position at the spindle 93. When the desired tool is located, rotational movement of the storage magazine 81 is interrupted with this tool at the transfer position 84.

With the desired tool at the transfer position 84, the transfer member 87 is actuated and is pivoted into position to pick up the tool assembly at the transfer position in one of the jaws 91, 92. Axial movement of the transfer member may be employed to remove the tool assembly from the storage member. Thereafter, continued rotational movement of the transfer member 87 brings the transfer member around to the spindle 93. At the spindle, the one of the jaws 91, 92 which is not carrying the tool assembly engages the tool already mounted in the spindle and removes it from the spindle. This operating usually entails axial movement of the transfer member 87, although axial movement of one or more parts of the spindle itself may be employed instead of or in addition to axial movement of the transfer member. Positioning and operation of the spindle is controlled, during this interval, by the drive 86. With the old tool displaced from the spindle 93, the new tool is deposited in the spindle and the old tool is returned to the storage position 84 and deposited in the storage member 83 located at the transfer position. Thereafter, the transfer mechanism 80 remains inactive until the next time a tool transfer operation is required.

The tool transfer mechanism 80 shown in schematic form in FIG. 4 is described and claimed in the co-pending application of James A. Stark, Serial No. 86,148 filed January 31, 1961. In connection with the present invention, it is intended to be exemplary only. Thus, it should be understood that the mechanical arrangement employed for the tool transfer mechanism may be modified, or may be substantially different in construction from that shown in FIG. 4, without departing in any way from the present invention. On the other hand, the basic control functions described hereinabove in connection with FIG. 4 are effected by the control system of the invention, and it is thus seen that the invention is integrated with the transfer mechanism.

FIG. 7 illustrates a control circuit 100 which represents a preferred control circuit for the present invention, and which, in many respects, is substantially similar to that described hereinabove in connection with FIG. 5. The complete control system 100 includes ten stages, each of which is a logical control circuit similar to the control circuit 60 of FIG. 5. However, only five of the logical control circuits are shown in FIG. 7, since each is a substantial duplicate of the others.

The control circuit 100 comprises an oscillator 101 including a transistor 102 having a base electrode 103, an emitter electrode 104, and a collector electrode 105. The frequency-determining circuit of the oscillator includes an inductance coil 106 which forms the primary winding of a coupling transformer 107. A capacitor 108 is connected in parallel with the winding 106 to afford a parallel resonant frequency-determining circuit. The center of the winding 106 is provided with a tap which is returned to ground through a resistor 109. One end of the resonant circuit is connected to the collector 105 through a resistor 111, whereas the other end of the resonant circuit is returned to the base electrode 103. The emitter 104 of the transistor 102 is returned to ground through a resistor 112, and the collector 105 is connected to a suitable source of operating potential E— by means of a resistor 113.

The secondary winding 114 of the transformer 107 comprises the input to a two-stage amplifier 115 which comprises one of the important features of the present invention. The amplifier 115 includes a first transistor 116 having a base electrode 117, an emitter electrode 118, and a collector electrode 119. The second transistor 121 of the amplifier includes a base electrode 112, an emitter electrode 123, and a collector electrode 124. The base or control electrode 117 of the first stage of the amplifier 115 is connected to one end of the secondary winding 114 on the transformer 107. The emitter or input electrode 118 is returned to ground through a resistor 125, whereas the output electrode, collector 119, is connected to the D.C. source E— through a load resistor 126. The collector 119 is also connected directly to the base electrode 122 of the second stage transistor 121.

A D.C. feedback path is provided between the second stage of the amplifier 115 and the first stage. This is a negative feedback path, and comprises a potentiometer 127 connected in the emitter circuit of the transistor 121, the tap on the potentiometer being returned to one terminal of the winding 114 in the control circuit of the transistor 116, this being the base circuit.

The collector electrode 124 of the second stage of the amplifier is connected to the primary winding 128 of an output transformer 129, the other terminal of the primary winding being connected to the D.C. source E—. The secondary winding 131 of the output transformer is provided with a center tap 132 which comprises the output terminal of the amplifier 115 and which is coupled to each of the logical control circuits of the control circuit 100 as described more fully hereinafter. One end of the winding 131 is grounded and the other terminal is returned to ground through a circuit comprising, in series, a blocking capacitor 133 and a feedback resistor 134. This same terminal of the winding 131 is also connected to the emitter 123 of the second stage transistor 121 through a feedback circuit comprising the potentiometer 127 and a resistor 138 and a capacitor 136, the latter two elements each being connected in parallel with the potentiometer and with each other.

As noted hereinabove, the control circuit 100 includes ten individual logical control elements, but only five of these are shown in FIG. 7 because they are substantially similar to each other. The five individual control circuits illustrated in FIG. 7 are designated by reference numerals 140, 141, 142, 148 and 149 and includes, respectively, the sensing elements comprising cores 30, 31, 32, 38 and 39 (see FIGS. 1–3). The output terminal 132 of the amplifier 115 is connected to one end of the primary winding on each of the sensing elements, the other end of each primary winding being returned to ground. Thus, with particular reference to circuit 149, it is seen that the output terminal 132 is directly connected to one terminal of the primary winding 42 for the sensing element 45, the other terminal of the winding 42 being grounded.

The output terminal 132 of the amplifier 115 is also returned to ground through a circuit comprising, in series, a potentiometer 151 and an adjustable resistor 152. The tap 153 on the potentiometer 151 is connected to a program control apparatus 154, and an additional connection is provided between the common terminal 155 of the resistances 151 and 152 and the program control apparatus. As explained more fully hereinafter, the connection to the potentiometer tap 153 affords the "X" signal for one coupling circuit in each of the logical control elements 140–149, whereas the connection to the terminal 155 provides the "zero" signal. The program control apparatus 154 is utilized to provide the variable impedances, which are preferably switches, required in the logical control elements to actuate those control elements in accordance with pre-recorded data, and thus affords switches corresponding to the switch 69 in FIG. 5. As noted hereinabove in connection with the description of FIG. 5, the program control apparatus 154 could include simply a series of switches individual to respective ones of the logical control elements and incorporated in a data reader, where the control data is recorded in the same code as the tool code. However, in many instances, this one-for-one correspondence is not possible, so that a more complex switching arrangement is required. Thus, the program control apparatus 154 may include a code translation switching arrangement of conventional construction and might, for example, comprise a cross-bar switch construction of the kind frequently employed in data handling and telephone circuitry. The individual switches of the control apparatus 154 are actuated in accordance with pre-recorded data, being coupled to a suitable data reader 156 which may, for example, be capable of reading and interpreting data from a punched tape, a magnetic tape, or other source.

Thus, the program control apparatus 154 includes a switch 169 or equivalent device for performing the same function as the switch 69 in FIG. 5. The switch 169 is connected to one terminal of the secondary winding 43 on the core 39 of the sensing element 45. The other terminal of the winding 43 is connected, through a coupling circuit comprising a resistor 171 connected in parallel with an inductance coil 172, to the base electrode 173 of a detector transistor 174. The emitter electrode 175 of the transistor is connected to a biasing circuit comprising a voltage divider that includes a resistor 176 connected in series with a pair of thermistors 177 and 178 and a further resistor 179. The resistor 179 is connected to a negative polarity D.C. source designated as D—, whereas the resistor 176 is returned to ground. The impedances of the resistive elements 176–179 are such that the emitter 175 is held near ground potential, this particular biasing circuit being adopted to provide thermal compensation for all of the detectors in the individual stages 140–149 of the control circuit 100.

The output circuit of the detector transistor 174 comprises the collector electrode 181, which is connected through a load resistor 182 to the negative D.C. source E—. The collector 181 is also connected to the base electrode 183 of an output amplifier transistor 184. The emitter 185 of the transistor 184 is connected through a resistor 186 to the D.C. source D—, whereas the collector electrode 187 is connected through the operating coil 188 of a relay 189 to the D.C. source E—. By comparison with FIG. 5, it may be seen that the relay 189 is essentially equivalent to the relay 68 shown therein, and, accordingly, the relay 189 is coupled to and is employed to control a tool transfer mechanism 190.

Each of the remaining stages of the control circuit 100 is essentially equivalent to the stage 149 as described hereinabove. Thus, in each instance the secondary winding of the sensing element is connected to a control switch or other variable impedance in the program control apparatus 154. The secondary windings of the sensing elements are also connected to suitable detector circuits, which are the same as the circuit for the detector transistor 174 described hereinabove. The output of each detector is coupled to the base electrode 183 of the buffer or control amplifier 184. As noted hereinabove, the primary winding of each sensing element is directly connected to the output terminal 132 of the amplifier 115.

In considering operation of the control circuit 100, attention may first be directed to the oscillator 101 and its output amplifier 115. The oscillator circuit itself is substantially conventional in construction, and does not require a detailed description herein; in essence, the oscillator develops a signal of substantially stable frequency determined by the inductance 106 and the capacitor 108. In the illustrated circuit, the operating frequency is five kilocycles, but this is not critical. This signal is applied to the first stage 116 of the amplifier 115 through the secondary winding 114 on the transformer 107. The signal is amplified in the circuit comprising the transistor 116 and is supplied to the control electrode of the second stage transistor 121, this being the base electrode 122. Further amplification is obtained in the second transition stage, and the output signal from the amplifier 115 is taken at the terminal 132 on the transformer secondary 131.

The amplifier 115 provides two distinct feedback paths which are substantially different from each other. The first feedback circuit extends from the potentiometer 127 in the emitter circuit of the second stage to the control electrode 117 of the first stage. This particular feedback circuit provides D.C. current stabilization. The second feedback path is provided by the circuit connection from the resistor 134 in the output circuit of the second stage of the emitter circuit of that stage. Because of the presence of the blocking capacitor 133, this negative feedback circuit is limited to A.C. signals. Of course, this circuit would also provide some negative A.C. feedback to the first stage, due to the presence of the potentiometer 127 in the emitter circuit of the second stage transistor, but this is effectively precluded by the use of a relatively large by-pass capacitor 136.

The operating effect of the A.C. feedback circuit of the amplifier 115 can perhaps best be understood by first considering the difficulties presented using a more conventional amplifier. In the first place, a stepdown transformer may be used in the output circuit of the amplifier to provide as low initial output impedance as possible. The stepdown ratio is limited, however, by the output voltage and load requirements; in the present instance the output voltage required is one volt, or approximately three volts peak-to-peak, with a load of one ohm. Under these conditions, the impedance of the transformer output secondary should not exceed 0.1 ohm. Assuming a transformer ratio of 10:1, giving an impedance ratio of 100:1, the required primary voltage (winding 128) would then be thirty volts peak-to-peak, a resonable value. But the 0.1 ohm secondary impedance would transform to 10 ohms in the primary and the transistor 121 would have to switch a three ampere current, which is clearly excessive at this impedance. The dissipation in the transistor 121 would have to be about five watts, which is also excessive, leaving no safety factor with transistors otherwise suitable for this application.

The situation deteriorates even further when consideration is given to the design of a practical transformer for the amplifier output circuit when the feedback circuit of the present invention is not employed. Generally speaking, it is difficult to reduce the D.C. resistance and leakage inductance of even a very good transformer to as low as one ohm, which is ten times the permissible value for the secondary impedance. For this reason, any negative feedback voltage employed to reduce the effective output impedance must come from the very end of the circuit. Otherwise, the output impedance would be too high even with a zero impedance source deriving the primary. A negative feedback voltage does reduce the effective output impedance by an amount proportional to the fraction of output voltage fed back. To achieve very low impedances, of course, this fraction should approach unity. Since it is the primary impedance that must be, in effect, reduced, the feedback voltage to the base circuit of the transistor 121 is referred to the collector electrode 124.

The amplifier 115 provides a negative feedback path in a circuit which is also effective to minimize D.C. resistance and leakage inductance in the secondary. Furthermore, the tapped secondary construction permits the use of an A.C. feedback circuit having a 1:1 turns ratio with respect to the primary. However, this is not the same as a circuit which derives the feedback voltage from the primary, despite the fact that the turns ratio is 1:1.

The total transformer flux does link both the low impedance output section of the secondary 131 and the total secondary winding, but this is not the same as the flux cutting the primary winding, due to leakage, etc. Thus, the circuit of the present invention places the full collector voltage in series with the input voltage to the transistor 121, as a negative feedback, the effective voltage gain being approximately unity, but the voltage is derived from the same flux that excites the output load winding.

This construction is highly desirable in the control circuit 100 because it makes it possible to provide a steady voltage to all ten of the sensing transformers in the control circuit regardless of whether they are loaded and are coupling energy into their secondary circuits. That is, the output voltage from the amplifier 115 remains substantially constant in operation despite the fact that any number (one to ten) of the primary circuits in the logical control elements to which the amplifier is directly coupled may be effectively loaded. Inasmuch as any substantial variation in the output voltage from the amplifier 115 could cause a malfunction of the logical control circuit, it is seen that the amplifier 115 is quite important to operation of the overall circuit, and presents a more simple and economical driving circuit than would be possible with previously known devices.

Operation of each of the logical control elements 140–149 in the circuit 100 is essentially the same as the circuit 60 described hereinabove in connection with FIG. 5. Thus, at the outset, it may be considered that the code ring 29 is located in sensing position relative to the core 39 of the variable reactor or transformer 45. As noted hereinabove, this is defined as the "zero" operating condition for the reactor. If the switch 169 is located in its "zero" position as shown in FIG. 7, no signal is applied to the secondary winding 43 of the reactor from the program control apparatus 154. Coupling from the primary to the secondary in the reactor 45 is negligible, and as a consequence the detector transistor 174, which is normally biased to be non-conductive, remains non-conductive. Accordingly, no significant signal is developed on the detector output bus 191. This operating condition corresponds to the "zero" operating condition described hereinabove for the logical control device 60.

Another operating condition would entail the location of a low-reluctance magnetic code ring in sensing position relative to the reactor 45. This changes the operating condition of the reactor to its "X" condition, with effective coupling between the primary and secondary windings of the reactor transformer. At this point, there is no longer coincidence between the operating conditions of the reactor 45 and the variable impedance or control switch 169. Consequently, the transistor 174 is rendered conductive on alternate half-cycles of the applied signal and develops a positive-going output signal on the collector 181. This output signal, which represents the "X" operating condition for the detector, actuates the amplifier transistor 184 and the relay 189 as described in detail hereinafter.

A similar result is achieved if the non-magnetic ring 29 is disposed at the sensing position but the switch 169 is actuated to its "X" position. The switch 169, in its "X" position, applies an actuating signal of substantial amplitude to the secondary winding 43 of the reactor transformer 45. As in the embodiment of FIG. 5, this signal is in phase opposition to the signal which would be induced in the winding 43 by coupling from the primary winding 42. However, with a non-magnetic ring in sensing position, coupling is essentially negligible in the reactor, so that a substantial signal is applied to the detector transistor 174 and specifically the base electrode of the transistor. Consequently, the detector is again rendered conductive on alternate half cycles and produces a positive-going signal on the output electrode, collector 181, and on the bus 191.

The final operating condition is one in which switch 169 is in its "X" position and a magnetic ring is disposed in sensing position relative to the sensing element 45. Under these conditions, the signal applied to the secondary winding 43 through the switch 169 effectively bucked by the signal induced in the winding 43 by coupling through the core 39 and the magnetic code ring to the primary winding 42. Because the two signals are in phase opposition, only a negligible output signal is applied to the detector transistor 174 and the transistor is not rendered conductive to an appreciable extent. Consequently, it is seen that the truth table of FIG. 6 applies directly to the logical control circuit 149 of FIG. 7. It is equally applicable to the other logical control elements 140–148 of the circuit 100.

The output transistor 184 of the circuit 100 is normally biased to be conductive, so that the relay 189 is normally held in energized condition. During a sensing operation, whenever coincidence exists between the position of the switches of control apparatus 154, such as the switch 169, and the conditions of the associated sensing elements, such as the reactor 45, no substantial change is effected with respect to the operation of the transistor 184 and the relay 189 remains energized. Stated differently, as long as the output of all of the logical circuit detectors such as the detector transistor 174, is in its "zero" condition, the relay 189 remains energized.

Whenever any of the detectors in the logical control elements is actuated from its "zero" to its "X" operating condition, however, a positive-going signal is developed on the bus 191. This signal drives the transistor 184 toward cut off, thereby effectively de-energizing the operating coil 188 of the relay 189. Consequently, the relay 189 affords a positive indication, during a sensing operation, of coincidence or lack of coincidence between the program control switches of the apparatus 154 and the code data instantaneously being sensed by the reactors of the logical control elements 140–149. It is thus seen that the control circuit 100 can be effectively employed to interpret the coding on the individual tool assemblies and to actuate the tool transfer mechanism at any time and in the desired manner to select one tool from however many may be located in the storage magazine. In the illustrated arrangement, whenever the relay 189 is de-energized, the transfer mechanism is conditioned to prevent a tool transfer operation.

In the logical control circuit 149, the coupling impedances between the transformer secondary 43 and the detector electrode 173 are utilized to prevent the transistor 174 from effectively short circuiting the winding 43 during the negative half cycles or rectifying half cycles of the A.C. signal induced in the winding or applied to the winding whenever the logical control circuit is in its "X" operating condition. The inductance is employed, in addition to the resistor, in order to maintain a low D.C. impedance in the base circuit of the detector. By keeping this base circuit resistance low, thermal stability of the detector is substantially enhanced.

In order to afford a more complete illustration of a preferred embodiment of the invention, certain circuit data are set forth hereinafter with respect to FIG. 7. It should be understood that this material is provided solely by way of illustration and in no sense as a limitation on the invention.

*Transistors*

| | |
|---|---|
| 102, 116, 184 | 2N651 |
| 121 | 2N176 |
| 174 (and other detectors) | 2N265 |

*Resistors*

| | | |
|---|---|---|
| 109, 113 | kilohms | 2.2 |
| 111, 171 | do | 47 |
| 112, 176, 186 | ohms | 10 |
| 125 | do | 47 |
| 126, 182 | kilohms | 1 |

Resistors—Continued

| | | |
|---|---|---|
| 127 (potentiometer) | ohms | 100 |
| 134 | do | 4.7 |
| 135 | do | 68 |
| 151 | do | 25 |
| 152 (adjustable) | do | 10 |
| 179 | do | 680 |

Capacitors

| | | |
|---|---|---|
| 108 | microfarads | 0.002 |
| 133 | do | 5 |
| 136 | do | 200 |

Operating Voltages

| | | |
|---|---|---|
| E— | volts D.C. | −16 |
| D— | do | −10 |

From the foregoing description, it may be seen that the control system of the invention, as applied to a data-controlled machine tool, is highly advantageous in that it eliminates any requirement for positive engagement between the sensing or interpreting device, such as the sensing apparatus 11, and the tool or tool assembly, such as the device 10. Since no element is moved physically by the actual sensing operation, the system is entirely independent of mechanical inertia in the operation of the sensing apparatus, permitting high-speed operation without introducing excessive wear and other maintenance difficulties. In fact, the control system of the invention provides a high-speed system which can operate indefinitely without requiring substantial maintenance yet which is quite simple and economical in construction. The particular amplifier circuit employed to drive the logical control devices is highly advantageous in that it affords an extremely low output impedance without sacrificing operational stability. Consequently, it is possible to vary the load on the output of this amplifier over a very wide range without adversely effecting the output voltage.

Hence, while preferred embodiments of the invention have been described and illustrated, it is to be understood that they are capable of variation and modification, and I therefore do not wish to be limited to the precise details set forth, but desire to avail myself of such changes and alterations as fall within the purview of the following claims.

I claim:

1. In a data-controlled machine tool, including a transfer mechanism for transferring a plurality of tool assemblies individually between a storage position and an operating position, a control system comprising: encoding means, individually associated with each tool assembly, for identifying said tool assembly in accordance with a predetermined digital code, said encoding means comprising a series of individual code elements, all of substantially similar dimensions and configuration but selected from two groups having different field-coupling properties, mounted on said tool assembly in predetermined alignment with each other; sensing means, located in close proximity to but spaced from said storage position, for sensing said code elements without physical engagement therewith, said sensing means comprising a plurality of individual field-sensitive sensing elements each exhibiting substantially different electrical properties when in close proximity to but spaced from code elements of said two different groups; and an electrically actuated control circuit, coupled to said sensing means, for controlling operation of said transfer mechanism in response to predetermined changes in the electrical properties of said sensing elements.

2. In a data-controlled machine tool, including a transfer mechanism for transferring a plurality of tool assemblies, individually, between a storage position and an operating position, a control system comprising: encoding means, individually associated with each tool assembly, for identifying said tool assembly, said encoding means comprising a series of individual code rings of uniform outside diameter selected from two groups having different magnetic field-coupling properties, one of said groups having a relatively low reluctance and the other having a relatively high reluctance; sensing means, located in close proximity to but spaced from said storage position, for sensing said code elements without physical engagement therewith, said sensing means comprising a plurality of individual magnetic sensing elements each exhibiting substantially different electrical properties when in close proximity to but spaced from code elements of said two different groups; and an electrically actuated control circuit coupled to said sensing means, for controlling operation of said transfer mechanism in response to predetermined changes in the electrical properties of said sensing elements.

3. In a data-controlled machine tool, including a transfer mechanism for transferring a plurality of transfer members individually between a storage position and an operating position, a control system comprising: encoding means, individually associated with each transfer member, for identifying said transfer member, said encoding means comprising a series of individual code elements, some of said code elements being of high-permeability magnetic material and others of low-permeability material; sensing means, located in close proximity to but spaced from said storage position, for sensing said code elements without physical engagement therewith, said sensing means comprising a plurality of individual field-sensitive sensing elements each comprising a magnetic core having a relatively large air gap and an input winding and an output winding mounted on said core, said core affording negligible coupling between said windings when a low-permeability code element is disposed in said air gap and affording substantial coupling between said windings when a high-permeability code element is disposed in said air gap; and an electrically actuated control circuit, coupled to said sensing means, for controlling operation of said transfer mechanism in response to predetermined changes in the coupling of the coils of said sensing elements.

4. In a data-controlled machine tool, including a transfer mechanism for transferring a plurality of tool transfer members, individually, between a storage position and an operating position, a control system comprising: encoding means, individually associated with each transfer member, for identifying said transfer member, said encoding means comprising a series of individual code elements selected from two groups having different field-coupling properties; sensing means, located in close proximity to but spaced from said storage position, for sensing said code elements without physical engagement therewith, said sensing means comprising a plurality of individual field-sensitive sensing elements each exhibiting substantially different electrical properties when in close proximity to but spaced from code elements of said two different groups; program control means for generating electrical control signals representative of a desired program of operation of said machine tool; and an electrically actuated control circuit coupled to said program control means and to said sensing means, for controlling operation of said transfer mechanism in response to coincidence between said control signals and predetermined changes in the electrical properties of said sensing elements.

5. In a data-controlled machine tool, including a transfer mechanism for transferring a plurality of tool transfer members individually between a storage position and an operating position, a control system comprising: encoding means, individually associated with each transfer member, for identifying said transfer member, said encoding means comprising a series of individual code elements selected from two groups having different field-coupling properties; sensing means, located adjacent said storage position, for sensing said code elements without physical engagement therewith, said sensing means comprising a plurality of individual field-sensitive sensing elements each comprising a coupling circuit actuatable between a low-impedance condition and a high-impedance condition in response to positioning of said sensing elements in close proximity to but spaced from code elements of said two different groups; and control circuit means coupled to said sensing means, for controlling operation of said transfer mechanism in response to predetermined changes in the impedance of said sensing elements, said control circuit means comprising a second plurality of coupling circuits, individually paired with and coupled to respective ones of said sensing element coupling circuits and actuatable between a high-impedance condition and a low-impedance condition, means for applying an A.C. signal in substantially different phase to said first and second coupling circuits of each pair, and an amplitude detector coupled to all of said coupling circuits and actuatable between a conductive and a non-conductive condition in response to coincidence in all of the paired coupling circuits.

6. In a data-controlled machine tool, including a transfer mechanism for transferring a plurality of tool transfer members individually between a storage position and an operating position, a control system comprising: encoding means, individually associated with each transfer member, for identifying said transfer member, said encoding means comprising a series of individual code elements selected from two groups having different field-coupling properties; sensing means, located adjacent said storage position, for sensing said code elements without physical engagement therewith, said sensing means comprising a plurality of individual field-sensitive sensing elements each comprising a coupling circuit including a variable reactance actuatable between a low-impedance condition and a high-impedance condition in response to positioning of said sensing elemeans in close proximity to but spaced from code elements of said two different groups; and control circuit means, coupled to said sensing means, for controlling operation of said transfer mechanism in response to predetermined changes in the impedance of said sensing elements, said control circuit means comprising a second plurality of coupling circuits, individually paired with and coupled to respective ones of said sensing element coupling circuits and each including a variable impedance actuatable between a high-impedance condition and a low-impedance condition, means for applying an A.C. signal of fixed frequency in substantially opposed phase to said first and second coupling circuits of each pair, and an amplitude detector coupled to all of said coupling circuits and actuatable between a conductive and a non-conductive condition in response to coincidence of the operating condition of the variable impedances in all of said coupling circuit pairs.

7. In a data-controlled machine tool, including a transfer mechanism for transferring a plurality of tool transfer members individually between a storage position and an operating position, a control system comprising: encoding means, individually associated with each transfer member, for identifying said transfer member, said encoding means comprising a series of individual code elements selected from two groups having different magnetic properties; sensing means, located adjacent said storage position for sensing said code elements without physical engagement therewith, said sensing means comprising a plurality of individual field-sensitive sensing elements each comprising a coupling transformer having a primary winding and a secondary winding and actuatable between a low-impedance condition and a high-impedance condition in response to positioning of said sensing element in close proximity to but spaced from code elements of said two different groups; and control circuit means coupled to said sensing means, for controlling operation of said transfer mechanism in response to predetermined changes in the impedance for said sensing elements, said control circuit comprising a second plurality of coupling circuits, individually paired with and coupled in series with respective ones of said sensing element secondary windings and each including a variable impedance actuatable between a high-impedance condition and a low-impedance condition, means for applying an A.C. signal in substantially different phase to the primary winding of the sensing element and the second coupling circuit in each pair, and an amplitude detector coupled to each of said secondary windings and actuatable between a conductive and a non-conductive condition in response to coincidence in impedance condition of the first and second coupling circuits of all pairs.

8. In a data-controlled machine tool, including a transfer mechanism for transferring a plurality of transfer members individually between a storage position and an operating position, a control system comprising: encoding means, individually associated with each transfer member, for identifying said transfer member, said encoding means comprising a series of individual code elements selected from two groups having different field-coupling properties; sensing means, located in close proximity to but spaced from said storage position, for sensing said code elements without physical engagement therewith, said sensing means comprising a plurality of individual field-sensitive sensing elements each exhibiting substantially different electrical properties when in close proximity to but spaced from code elements of said two different groups; and electrically actuated control circuit means, coupled to said sensing means, for controlling operation of said transfer mechanism in response to predetermined changes in the electrical properties of said sensing elements, said control circuit means comprising a plurality of coincidence circuits each including one of said sensing elements and an independent data-responsive control element coupled thereto.

9. In a data-controlled machine tool, including a transfer mechanism for transferring a plurality of transfer members individually between a storage position and an operating position, a control system comprising: encoding means, individually associated with each transfer member, for identifying said transfer member, said encoding means comprising a series of individual code elements selected from two groups having different field-coupling properties; sensing means, located in close proximity to but spaced from said storage position, for sensing said code elements without physical engagement therewith, said sensing means comprising a plurality of individual field-sensitive sensing elements each exhibiting substantially different electrical properties when in close proximity to but spaced from code elements of said two different groups; and electrically actuated control circuit means, coupled to said sensing means, for controlling operation of said transfer mechanism in response to predetermined changes in the electrical properties of said sensing elements, said control circuit means comprising a plurality of quarter-adder circuits each including one of said sensing elements and at least one independent data-responsive control element coupled thereto, and a detector circuit coupled to all of said quarter-adder circuits and actuatable between a first and a second operating condition in response to coincident conditions in all of said quarter-adder circuits.

10. In a data-controlled machine tool, including a transfer mechansim for transferring a plurality of transfer members individually between a storage position and an operating position, a control system comprising: encoding means, individually associated with each transfer member, for identifying said transfer member, said encoding means comprising a series of individual code elements selected from two groups having different field-coupling properties; sensing means, located adjacent said storage position, said sensing means comprising a plurality of individual field-sensitive sensing elements each exhibiting substantially different electrical properties when in close promixity to code elements of said two different groups; electrically actuated control means, coupled to said sensing means and comprising a similar plurality of individual control circuits individually coupled to said sensing elements to form a corresponding plurality of logical control devices, for controlling operation of said transfer mechanism in response to predetermined changes in the electrical properties of said sensing elements; and energizing circuit means for said logical control devices, said energizing circuit means comprising first and second transistors each including an input electrode, an output electrode, and a control electrode, the control electrode of said second transistor being coupled to the output electrode of said first transistor to afford two amplifier stages in series, a first feedback circuit, interconnecting said input electrode of said second transistor with said control electrode of said first transistor and affording a negative D.C. feedback path therebetween, and a second feedback circuit, coupling said output electrode of said second transistor to said input electrode of said second transistor and affording a negative A.C. feedback path therebetween.

11. In a data-controlled machine tool, including a transfer mechanism for transferring a plurality of transfer members individually between a storage position and an operating position, a control system comprising: encoding means, individually associated with each transfer member, for identifying said transfer member, said encoding means comprising a series of individual code elements selected from two groups having different field-coupling properties; sensing means, located adjacent said storage position, said sensing means comprising a plurality of individual field-sensitive sensing elements each exhibiting substantially different electrical properties when in close proximity to code elements of said two different groups; electrically actuated control means, coupled to said sensing means and comprising a similar plurality of individual control circuits individually coupled to said sensing elements to form a corresponding plurality of logical control devices, for controlling operation of said transfer mechanism in response to predetermined changes in the electrical properties of said sensing elements; and energizing circuit means for said logical control devices, said energizing circuit means comprising a transistor including an input electrode, an output electrode, and a control electrode, an input circuit coupled to said input and control electrodes; and output transformer including a primary winding connected to said output electrode and a secondary winding, and having approximately unity turns ratio therebetween; output circuit means for deriving an output signal from only a fractional portion of said secondary winding to afford a relatively large stepdown ratio in the output signal circuit, and feedback circuit means coupling said secondary winding to said input circuit for applying to said input circuit a negative A.C. feedback signal derived from the same flux path that excites said output circuit means.

References Cited in the file of this patent

UNITED STATES PATENTS

| | | |
|---|---|---|
| 2,123,241 | Harley | July 12, 1938 |
| 2,440,916 | Rusnak et al. | May 4, 1948 |
| 2,514,267 | Watkinson | July 4, 1950 |
| 2,608,621 | Peterson | Aug. 26, 1952 |
| 2,792,545 | Kamm | May 14, 1957 |
| 2,793,546 | Opel | May 28, 1957 |
| 2,901,927 | Morgan | Sept. 1, 1959 |
| 2,923,921 | Shapin | Feb. 2, 1960 |
| 2,946,897 | Mayo | July 26, 1960 |
| 2,950,005 | MacDonald | Aug. 23, 1960 |
| 2,965,291 | Hayes et al. | Dec. 20, 1960 |
| 2,989,735 | Gumpertz | June 20, 1961 |
| 3,042,201 | Kuehnle et al. | July 3, 1962 |
| 3,052,011 | Brainard et al. | Sept. 4, 1962 |

FOREIGN PATENTS

| | | |
|---|---|---|
| 800,190 | Great Britain | Aug. 20, 1958 |
| 1,236,668 | France | June 13, 1960 |